(12) United States Patent
Telkamp et al.

(10) Patent No.: US 12,496,768 B2
(45) Date of Patent: Dec. 16, 2025

(54) ELASTIC ADDITIVE MANUFACTURED PARTS HAVING EMBEDDED WOVEN LAYER FOR IMPROVED WEAR RESISTANCE, DURABILITY AND ELECTRICAL CONDUCTIVITY

(71) Applicants: Airbus Americas, Inc., Mobile, AL (US); Airbus Operations GmbH, Hamburg (DE)

(72) Inventors: Michael Telkamp, Hamburg (DE); Dirk Humfeldt, Hamburg (DE); Jeffrey Nangle, Wichita, KS (US)

(73) Assignees: Airbus Operations GmbH, Hamburg (DE); Airbus Americas, Inc., Mobile, AL (US)

( * ) Notice: Subject to any disclaimer, the term of this patent is extended or adjusted under 35 U.S.C. 154(b) by 199 days.

(21) Appl. No.: 18/385,703

(22) Filed: Oct. 31, 2023

(65) Prior Publication Data

US 2025/0135714 A1    May 1, 2025

(51) Int. Cl.
    *B29C 64/106*         (2017.01)
    *B29C 64/209*         (2017.01)
    *B29C 64/245*         (2017.01)
    *B29C 64/295*         (2017.01)
    *B29C 64/321*         (2017.01)
(Continued)

(52) U.S. Cl.
CPC .......... *B29C 64/106* (2017.08); *B29C 64/209* (2017.08); *B29C 64/245* (2017.08); *B29C 64/295* (2017.08); *B29C 64/321* (2017.08); *B29C 70/22* (2013.01); *B33Y 30/00* (2014.12); *B33Y 70/00* (2014.12);
(Continued)

(58) Field of Classification Search
CPC ... B29C 64/106; B29C 64/118; B29C 64/209; B29C 64/245; B29C 64/295; B29C 64/321; B29C 70/22; B33Y 30/00; B33Y 70/00; B29K 2995/0087; B29K 2995/0097; B29K 2995/0005
See application file for complete search history.

(56) References Cited

U.S. PATENT DOCUMENTS

| | | | | |
|---|---|---|---|---|
| 5,750,444 A | * | 5/1998 | Jarrell | B32B 5/26 118/325 |
| 6,860,953 B1 | * | 3/2005 | Grizzle | D06N 7/0086 264/37.32 |

(Continued)

*Primary Examiner* — Nahida Sultana
(74) *Attorney, Agent, or Firm* — KDW Firm PLLC

(57) ABSTRACT

Additive manufacturing systems and methods having an extrusion head with a nozzle. The nozzle extrudes a composite material from an orifice of the nozzle to form a layer of a component. The composite material has at least a matrix material and a reinforcing material. The nozzle extrudes the matrix and reinforcing materials from the orifice simultaneously. The width and height of the orifice are adjustable to control the width and thickness of the layer extruded therefrom. The width and thickness of the layer are the same as the width and height, respectively, of the nozzle orifice, while the nozzle is extruding the composite material through the orifice. The width and height of the nozzle orifice are perpendicular to each other and transverse to an extrusion direction from the nozzle orifice. A majority of a surface area of the reinforcing material is encapsulated within the matrix material after being dispensed from the nozzle.

22 Claims, 9 Drawing Sheets

(51) Int. Cl.
  *B29C 70/22*   (2006.01)
  *B33Y 30/00*   (2015.01)
  *B33Y 70/00*   (2020.01)

(52) U.S. Cl.
  CPC ............... *B29K 2995/0005* (2013.01); *B29K 2995/0087* (2013.01); *B29K 2995/0097* (2013.01)

(56) References Cited

U.S. PATENT DOCUMENTS

| | | | |
|---|---|---|---|
| 10,259,160 B2* | 4/2019 | Mark | B29C 64/20 |
| 11,237,542 B2* | 2/2022 | Mark | B29C 64/118 |
| 2001/0009710 A1* | 7/2001 | Zegler | B29B 17/0026 |
| | | | 428/85 |
| 2001/0016244 A1* | 8/2001 | Preston | D06N 7/0086 |
| | | | 428/95 |
| 2019/0039311 A1* | 2/2019 | Busbee | A43B 17/14 |
| 2019/0217536 A1* | 7/2019 | Honorato Ruiz | B29C 70/081 |
| 2019/0299522 A1* | 10/2019 | Chapiro | B29C 70/38 |
| 2019/0366639 A1* | 12/2019 | Barocio | B33Y 70/10 |
| 2020/0001522 A1* | 1/2020 | Manuel | B29C 64/218 |
| 2020/0149269 A1* | 5/2020 | Crump | D04B 1/00 |
| 2021/0017089 A1* | 1/2021 | Thrasher | B33Y 70/10 |
| 2021/0031436 A1* | 2/2021 | Ramia | B29C 64/295 |
| 2022/0184880 A1* | 6/2022 | Barnes | B29C 70/38 |
| 2022/0314561 A1* | 10/2022 | Khirpunov | B29C 35/0805 |

* cited by examiner

ELASTIC ADDITIVE MANUFACTURED PARTS HAVING EMBEDDED WOVEN LAYER FOR IMPROVED WEAR RESISTANCE, DURABILITY AND ELECTRICAL CONDUCTIVITY

TECHNICAL FIELD

The disclosure herein relates to systems and methods for additively manufacturing a component having, in one or more (e.g., as many as all) layers thereof, a reinforcing material, such as a woven, or mesh-like, fibrous material, embedded therein by being extruded simultaneously with a matrix material from an extrusion head. Moreover, the disclosure herein relates to systems and methods for additively manufacturing seals for use in aircraft that have improved wear-resistance and/or electrical conductivity characteristics over presently known seals.

BACKGROUND

Poorly fitting air pressure seals in aircraft cabins can pose a range of problems, some of which can have detrimental consequences for both the passengers and the aircraft itself. These problems are primarily associated with maintaining the desired cabin pressure, ensuring passenger comfort and safety, and fuel consumption of the aircraft. Known air pressure seals are difficult to maintain in a desired shape for mating against a sealing surface and/or from being damaged during normal use due to the inherently low wear resistance for materials conventionally used for such seals. Thus, a need exists for systems and methods for producing components, such as aircraft seals, using additive manufacturing techniques that can better control the shape and/or deformation of the component and can provide the component with enhanced wear-resistant characteristics and/or provide electrical conductivity on a surface of and/or within the component.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this summary does not list or suggest all possible combinations of such features.

The following presents a summary to provide a basic understanding of one or more embodiments of the disclosure. This summary is not intended to identify key or critical elements, or to delineate any scope of particular embodiments or any scope of the claims. Its sole purpose is to present concepts in a simplified form as a prelude to the more detailed description that is presented later.

According to a first example embodiment, an additive manufacturing system is provided, the additive manufacturing system comprising an extrusion head comprising a nozzle, the nozzle being configured to extrude a composite material from an orifice of the nozzle to form a layer of a component manufactured using additive manufacturing. In this embodiment, the composite material comprises a matrix material and a reinforcing material, the nozzle is configured to extrude the matrix material and the reinforcing material from the orifice simultaneously, a width and a height of the orifice of the nozzle are both adjustable to control a width and a thickness of the layer extruded through the orifice of the nozzle, the width and the thickness of the layer is substantially a same as the width and the height, respectively, of the orifice of the nozzle, when the composite material is extruded through the orifice of the nozzle the width and the height of the orifice of the nozzle are perpendicular to each other and transverse to a direction of extrusion of the composite material from the orifice of the nozzle, and the system is configured to dispense the reinforcing material from the nozzle such that a majority of a surface area of the reinforcing material is encapsulated within the matrix material.

In some aspects of the additive manufacturing system, the matrix material comprises or consists of an elastomeric material, a thermoplastic material, and/or a duroplastic material and/or wherein the reinforcing material comprises or consists of a woven or knitted material having warp fibers and weft fibers.

In some aspects of the additive manufacturing system, the woven material has a thickness that is a same as a thickness of the matrix material, such that at least a portion of the woven material is at or protruding through, to at least some degree, one or both outermost surfaces of the matrix material in a direction of the thickness of the layer.

In some aspects of the additive manufacturing system, the woven material is more wear-resistant than the matrix material.

In some aspects of the additive manufacturing system, the woven material comprises an electrically conductive material.

In some aspects of the additive manufacturing system, the electrically conductive material is a metal and/or a metal alloy.

In some aspects of the additive manufacturing system, the warp fibers are all arranged at about a 90° angle to the weft fibers.

In some aspects of the additive manufacturing system, the reinforcing material is oriented such that warp fibers and the weft fibers are arranged at about +45° and −45° orientations, respectively, relative to the direction of extrusion of the composite material from the orifice of the nozzle.

In some aspects of the additive manufacturing system, the nozzle comprises internal blades configured to dispense the woven material from a channel defined between the internal blades; the system is configured to extrude matrix material from the channel simultaneously with the woven material for form an internal sublayer of the layer; the internal blades define, on opposite sides of the channel, a first bypass channel and a second bypass channel; and the nozzle is configured, when the first and second bypass channels are not closed, to extrude the matrix material to form first and second outer sublayers that are devoid of the woven material, the first outer sublayer being on an opposite side of the internal sublayer from the second outer sublayer.

In some aspects of the additive manufacturing system, a distance between the internal blades defines a thickness of the internal sublayer; the woven material has a same thickness as the thickness of the internal sublayer; and the distance between the internal blades is adjustable by moving the internal blades towards or away from each other to adjust the thickness of the internal sublayer and also a thickness of the first and/or second outer sublayers.

In some aspects of the additive manufacturing system, the internal blades are movable within the nozzle to adjust the distance between the internal blades between a minimum distance and a maximum distance; and the maximum distance is substantially similar to the height of the orifice of the nozzle, such that the first and second bypass channels are closed by the internal blades when the internal blades are at the maximum distance.

In some aspects of the additive manufacturing system, the internal blades are movable independent of each other to adjust a position of the internal sublayer, relative to a direction of the thickness of the layer, within the layer, such that the internal sublayer is biased towards, or closer to, a first surface of the layer than a second surface of the layer, the first surface and the second surface being opposite surfaces of the layer that are spaced apart from each other in the direction of the thickness of the layer.

In some aspects of the additive manufacturing system, the nozzle is configured to extrude the woven material within the layer such that the woven material is both at, adjacent to, and/or protruding through the first surface of the layer and also spaced apart from and entirely covered or embedded within the second surface of the layer.

In some aspects of the additive manufacturing system, when the first and second bypass channels are open, the layer extruded from the orifice of the nozzle consists of the first outer sublayer, the second outer sublayer, and the internal sublayer, wherein the internal sublayer is between the first and second outer sublayers; when the first bypass channel is open and the second bypass channel is closed, the layer extruded from the orifice of the nozzle consists of the first outer sublayer and the internal sublayer; when the first bypass channel is closed and the second bypass channel is open, the layer extruded from the orifice of the nozzle consists of the second outer sublayer and the internal sublayer; and when the first and second bypass channels are closed, the layer extruded from the orifice of the nozzle consists of the internal sublayer.

In some aspects of the additive manufacturing system, when the first and second bypass channels are open, the layer extruded from the orifice of the nozzle comprises the first outer sublayer, the second outer sublayer, and the internal sublayer, wherein the internal sublayer is between the first and second outer sublayers; when the first bypass channel is open and the second bypass channel is closed, the layer extruded from the orifice of the nozzle comprises the first outer sublayer and the internal sublayer; when the first bypass channel is closed and the second bypass channel is open, the layer extruded from the orifice of the nozzle comprises the second outer sublayer and the internal sublayer; and when the first and second bypass channels are closed, the layer extruded from the orifice of the nozzle comprises the internal sublayer.

In some aspects of the additive manufacturing system, the woven material is fully embedded within the layer and the layer is devoid of any cavities or air pockets formed therein.

In some aspects, the additive manufacturing system comprises a build plate, wherein the nozzle is configured to extrude the composite material onto the build plate to form the layer of the component while the nozzle is inclined at an angle relative to a surface of the build plate onto which the composite material is extruded, and wherein, when the nozzle is inclined at the angle relative to the surface of the build plate, a plane that is defined by the width and the height of the orifice is substantially perpendicular to the surface of the build plate.

In some aspects of the additive manufacturing system, the angle is less than 90°.

In some aspects of the additive manufacturing system, the angle is in a range between 0° and 45°, inclusive, between 0° and 30°, inclusive, between 0° and 20°, inclusive, or between 5° and 25°, inclusive.

In some aspects, the additive manufacturing system comprises a controller configured to control a temperature of the surface of the build plate while the composite material is extruded onto the surface of the build plate.

In some aspects, the additive manufacturing system comprises a build chamber, in which the component is additively manufactured, and a controller configured to control a temperature within the build chamber.

In some aspects, the additive manufacturing system comprises a tool head, to which the nozzle is operably attached, wherein the tool head is configured to rigidly support and control a movement of the nozzle.

In some aspects, the additive manufacturing system comprises one or more of a cutter, a grinder, a suction head, and a spray nozzle, each of which is configured for operable connection to the tool head.

In some aspects, the additive manufacturing system comprises a clamp that is configured to grasp an edge region of the reinforcing material, directly or indirectly, and hold the edge region of the reinforcing material in a static position while the nozzle moves away from the clamp to extrude the composite material from the orifice of the nozzle.

In some aspects of the additive manufacturing system, the extrusion head is configured to receive one or more matrix materials and/or a granulate material and to form the matrix material therefrom.

In some aspects of the additive manufacturing system, the extrusion head comprises a mixer configured to mix together at least two components to form a multi-component polymer, the matrix material comprising the multi-component polymer.

In some aspects of the additive manufacturing system, the extrusion head is configured to intermix additives with the matrix material to control a color and/or one or more mechanical properties of the component.

In some aspects, the additive manufacturing system comprises a cutter configured to cut the reinforcing material to have a profile that corresponds to a profile of the layer of the component being extruded from the orifice of the nozzle.

In some aspects of the additive manufacturing system, the reinforcing material is cut by the cutter before the reinforcing material enters the extrusion head.

In some aspects, the additive manufacturing system comprises a controller configured to continuously adjust the width of the orifice of the nozzle to be a same as, no more than 10% larger than, or no more than 25% larger than, a width of the profile of the reinforcing material along an entire length of the profile of the reinforcing material.

In some aspects of the additive manufacturing system, at every point along the entire length of the profile of the reinforcing material, the width of the nozzle and, thus, also of the layer, is a same as, no more than 10% larger than, or no more than 25% larger than, the width of the profile at a same point along the entire length of the profile of the reinforcing material.

In some aspects of the additive manufacturing system, the nozzle comprises internal opposing surfaces that converge towards each other in a direction of the orifice to form the reinforcing material to have a same thickness as the height of the orifice when the composite material is extruded from the orifice.

In some aspects of the additive manufacturing system, the nozzle comprises a heater in a lower part of the nozzle, the lower part of the nozzle being arranged against a surface onto which the layer is extruded by the nozzle, wherein the heater is configured to heat the lower part of the nozzle.

In some aspects of the additive manufacturing system, the nozzle comprises a passage through the lower part of the nozzle and openings formed in the lower part of the nozzle, the openings being in fluidic communication with the passage; and the openings are directed to point towards a surface onto which the layer is extruded by the nozzle.

In some aspects of the additive manufacturing system, before the layer is extruded from the nozzle onto a portion of the surface: the passage is configured to transport a primer, a bonding agent, or a plasma to the openings; and the openings are configured to emit the primer, the bonding agent, or the plasma over and directly onto the portion of the surface.

According to a second example embodiment, a method for creating a component using additive manufacturing is provided, the method comprising providing an extrusion head comprising a nozzle; moving the extrusion head and simultaneously extruding a composite material from an orifice of the nozzle to form a layer of the component; and adjusting a width and a height of the orifice of the nozzle to control a width and a thickness of the layer extruded through the orifice of the nozzle. According to this embodiment of the method, the composite material comprises a matrix material and a reinforcing material that are simultaneously extruded from the orifice of the nozzle; the width and the thickness of the layer is substantially a same as the width and the height, respectively, of the orifice of the nozzle, when the composite material is extruded through the orifice of the nozzle; the width and the height of the orifice of the nozzle are perpendicular to each other and transverse to a direction of extrusion of the composite material from the orifice of the nozzle; and the reinforcing material is dispensed from the nozzle such that a majority of a surface area of the reinforcing material is encapsulated within the matrix material.

In some aspects of the method, the matrix material comprises or consists of an elastomeric material, a thermoplastic material, and/or a duroplastic material and/or wherein the reinforcing material comprises or consists of a woven or knitted material having warp fibers and weft fibers.

In some aspects of the method, the woven material has a thickness that is a same as a thickness of the matrix material, such that at least a portion of the woven material is at or protruding through, to at least some degree, one or both outermost surfaces of the matrix material in a direction of the thickness of the layer.

In some aspects of the method, the woven material is more wear-resistant than the matrix material.

In some aspects of the method, the woven material comprises an electrically conductive material.

In some aspects of the method, the electrically conductive material is a metal and/or a metal alloy.

In some aspects of the method, the warp fibers are all arranged at about a 90° angle to the weft fibers.

In some aspects of the method, the reinforcing material is oriented such that warp fibers and the weft fibers are arranged at about +45° and −45° orientations, respectively, relative to the direction of extrusion of the composite material from the orifice of the nozzle.

In some aspects of the method, the nozzle comprises internal blades that dispense the woven material from a channel defined between the internal blades; the matrix material is extruded from the channel simultaneously with the woven material for form an internal sublayer of the layer; the internal blades define, on opposite sides of the channel, a first bypass channel and a second bypass channel; and when the first and second bypass channels are not closed, the nozzle extrudes the matrix material to form first and second outer sublayers that are devoid of the woven material, the first outer sublayer being on an opposite side of the internal sublayer from the second outer sublayer.

In some aspects, the method comprises controlling a distance between the internal blades to define a thickness of the internal sublayer; the woven material has a same thickness as the thickness of the internal sublayer; and the distance between the internal blades is adjustable by moving the internal blades towards or away from each other to adjust the thickness of the internal sublayer and also a thickness of the first and/or second outer sublayers.

In some aspects of the method, the internal blades are movable within the nozzle to adjust the distance between the internal blades between a minimum distance and a maximum distance; and the maximum distance is substantially similar to the height of the orifice of the nozzle, such that the first and second bypass channels are closed by the internal blades when the internal blades are at the maximum distance.

In some aspects of the method, the internal blades are movable independent of each other to adjust a position of the internal sublayer, relative to a direction of the thickness of the layer, within the layer, such that the internal sublayer is biased towards, or closer to, a first surface of the layer than a second surface of the layer, the first surface and the second surface being opposite surfaces of the layer that are spaced apart from each other in the direction of the thickness of the layer.

In some aspects of the method, the nozzle extrudes the woven material within the layer such that the woven material is both at, adjacent to, and/or protruding through the first surface of the layer and also spaced apart from and entirely covered or embedded within the second surface of the layer.

In some aspects of the method, when the first and second bypass channels are open, the layer extruded from the orifice of the nozzle consists of the first outer sublayer, the second outer sublayer, and the internal sublayer, wherein the internal sublayer is between the first and second outer sublayers; when the first bypass channel is open and the second bypass channel is closed, the layer extruded from the orifice of the nozzle consists of the first outer sublayer and the internal sublayer; when the first bypass channel is closed and the second bypass channel is open, the layer extruded from the orifice of the nozzle consists of the second outer sublayer and the internal sublayer; and when the first and second bypass channels are closed, the layer extruded from the orifice of the nozzle consists of the internal sublayer.

In some aspects of the method, when the first and second bypass channels are open, the layer extruded from the orifice of the nozzle comprises the first outer sublayer, the second outer sublayer, and the internal sublayer, wherein the internal sublayer is between the first and second outer sublayers; when the first bypass channel is open and the second bypass channel is closed, the layer extruded from the orifice of the nozzle comprises the first outer sublayer and the internal sublayer; when the first bypass channel is closed and the second bypass channel is open, the layer extruded from the orifice of the nozzle comprises the second outer sublayer and the internal sublayer; and when the first and second bypass channels are closed, the layer extruded from the orifice of the nozzle comprises the internal sublayer.

In some aspects of the method, the woven material is fully embedded within the layer and the layer is devoid of any cavities or air pockets formed therein.

In some aspects, the method comprises extruding the composite material from the nozzle onto a build plate to form the layer of the component while the nozzle is inclined at an angle relative to a surface of the build plate onto which the composite material is extruded, and wherein, when the nozzle is inclined at the angle relative to the surface of the build plate, a plane that is defined by the width and the height of the orifice is substantially perpendicular to the surface of the build plate.

In some aspects of the method, the angle is less than 90°.

In some aspects of the method, the angle is in a range between 0° and 45°, inclusive, between 0° and 30°, inclusive, between 0° and 20°, inclusive, or between 5° and 25°, inclusive.

In some aspects, the method comprises controlling, using a controller, a temperature of the surface of the build plate while the composite material is extruded onto the surface of the build plate.

In some aspects of the method, the component is additively manufactured within a build chamber, the method comprising controlling, using a controller, a temperature within the build chamber.

In some aspects of the method, the nozzle is operably attached to a tool head that rigidly supports and controls a movement of the nozzle.

In some aspects, the method comprises operably connecting one or more of a cutter, a grinder, a suction head, and a spray nozzle to the tool head.

In some aspects, the method comprises grasping, using a clamp, an edge region of the reinforcing material, directly or indirectly; and simultaneously holding, using the clamp, the edge region of the reinforcing material in a static position and moving the nozzle away from the clamp and extruding the composite material from the orifice of the nozzle.

In some aspects, the method comprises receiving, in the extrusion head, one or more matrix materials and/or a granulate material; and forming the matrix material from the one or more matrix materials and/or the granulate material.

In some aspects of the method, the extrusion head comprises a mixer, the method comprising mixing together at least two components to form a multi-component polymer, the matrix material comprising the multi-component polymer.

In some aspects, the method comprises intermixing, using the extrusion head, additives with the matrix material to control a color and/or one or more mechanical properties of the component.

In some aspects, the method comprises cutting, using a cutter, the reinforcing material to have a profile that corresponds to a profile of the layer of the component being extruded from the orifice of the nozzle.

In some aspects of the method, the cutting of the reinforcing material occurs before the reinforcing material enters the extrusion head.

In some aspects, the method comprises continuously adjusting, using a controller, the width of the orifice of the nozzle to be a same as, no more than 10% larger than, or no more than 25% larger than, a width of the profile of the reinforcing material along an entire length of the profile of the reinforcing material.

In some aspects of the method, at every point along the entire length of the profile of the reinforcing material, the width of the nozzle and, thus, also of the layer, is a same as, no more than 10% larger than, or no more than 25% larger than, the width of the profile at a same point along the entire length of the profile of the reinforcing material.

In some aspects of the method, the nozzle comprises internal opposing surfaces that converge towards each other in a direction of the orifice to form the reinforcing material to have a same thickness as the height of the orifice when the composite material is extruded from the orifice.

In some aspects, the method comprises providing a heater in a lower part of the nozzle; arranging the lower part of the nozzle against a surface onto which the layer is extruded by the nozzle; and heating, using the heater, the lower part of the nozzle to, in turn, heat the surface onto which the layer is extruded by the nozzle.

In some aspects of the method, the nozzle comprises a passage through the lower part of the nozzle and openings formed in the lower part of the nozzle, the openings being in fluidic communication with the passage; and the openings are directed to point towards a surface onto which the layer is extruded by the nozzle.

In some aspects, the method comprises, before the layer is extruded from the nozzle onto a portion of the surface, transporting a primer, a bonding agent, or a plasma to the openings through the passage; and emitting, through the openings, the primer, the bonding agent, or the plasma over and directly onto the portion of the surface.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely an example of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

DETAILED DESCRIPTION

Figure 1:
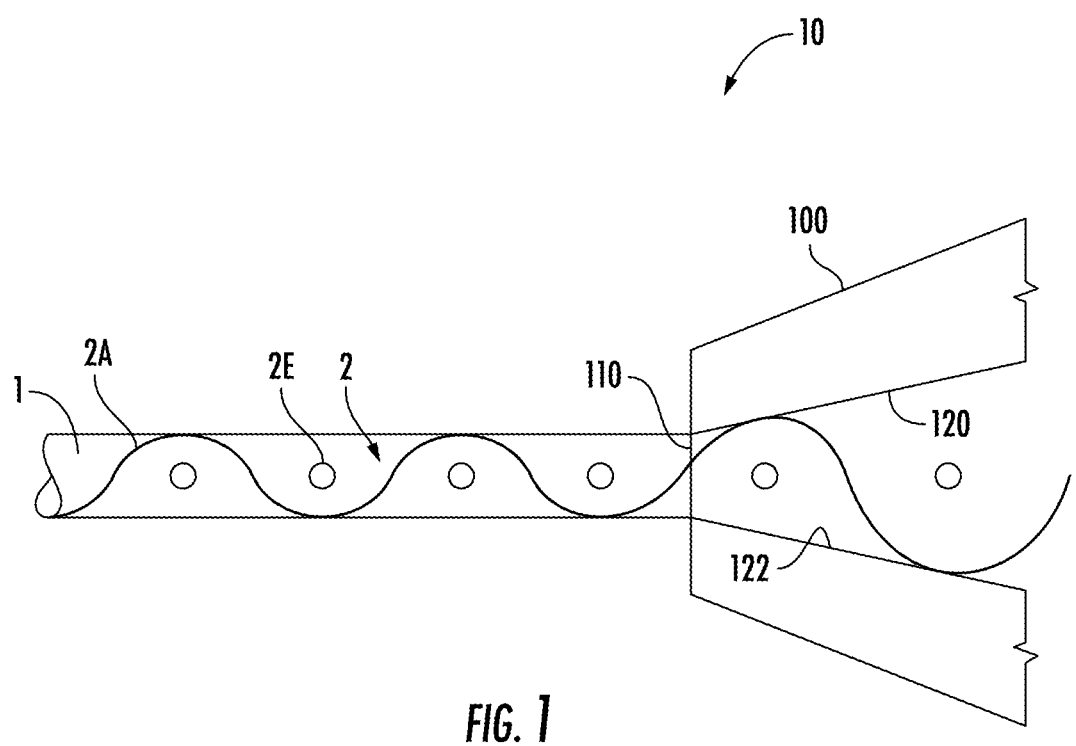
FIG. 1 is a schematic side view of an example embodiment of an additive manufacturing system having an extrusion head with a nozzle to extrude a composite material during additive manufacture of a component.

In the description below, without being restricted hereto, specific details are presented in order to give a complete understanding of the disclosure herein. It is, however, clear to a person skilled in the art that the disclosure herein may be used in other example embodiments which may differ from the details outlined below. The figures serve furthermore merely to illustrate example embodiments, are not to scale, and serve merely to illustrate by example the general concept of the disclosure herein. For example, features contained in the figures must not necessarily be considered to be essential components.

Comparable or identical components and features, or those with similar effect, carry the same reference signs in the figures. For reasons of clarity, in the figures sometimes the reference signs of individual features and components have been omitted, wherein these features and components carry reference signs in the other figures.

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the presently disclosed subject matter.

While the following terms are believed to be well understood by one of ordinary skill in the art, the following definitions are set forth to facilitate explanation of the presently disclosed subject matter.

All technical and scientific terms used herein, unless otherwise defined herein, are intended to have the same meaning as commonly understood by one of ordinary skill in the art. References to techniques employed herein are intended to refer to the techniques as commonly understood in the art, including variations on those techniques or substitutions of equivalent techniques that would also be apparent to one of skill in the art. While the following terms are believed to be well understood by one of ordinary skill in the art, the following definitions are set forth to facilitate explanation of the presently disclosed subject matter.

In describing the presently disclosed subject matter, it should be understood that a number of techniques, features, steps, etc. are disclosed. Each of these has individual benefit and each can also be used in conjunction with one or more, or in some cases all, of the other disclosed techniques, features, steps, etc.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Following long-standing patent law convention, the terms "a", "an", and "the" refer to "one or more" when used in this application, including the claims. Thus, for example, reference to "a vertical post" includes a plurality of such vertical posts, and so forth.

Unless otherwise indicated, all numbers expressing quantities of structures, features, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate for the disclosed devices, compositions, systems and/or methods.

The term "comprising," which is synonymous with "including," "containing," and/or "characterized by," is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or feature not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

As used herein, the term "and/or," when used in the context of a listing of entities, refers to the entities being present singly or in any combination. Thus, for example, the phrase "A, B, C, and/or D" includes A, B, C, and D individually, but also includes any and all combinations and subcombinations of A, B, C, and D.

It will be understood that various details of the presently disclosed subject matter may be changed without departing from the scope of the presently disclosed subject matter.

Furthermore, the foregoing description is for the purpose of illustration only, and not for the purpose of limitation.

FIG. 1 shows a first example embodiment of an additive manufacturing system, generally designated 10, comprising a nozzle 100. The nozzle is configured to co-extrude (e.g., simultaneously) a matrix material 1 and a reinforcing material 2, which is at least partially (e.g., by wetted surface area, at least 60%, at least 75%, at least 90%, or at least 95%) immersed or embedded within the matrix material 1. The matrix material 1 can be any material suitable for use in additive manufacturing. Non-limiting examples of materials that can be used for the matrix material 1 are thermoplastic materials, duroplastic materials, and elastomeric materials. The reinforcing material 2 can be any suitable material suitable for being embedded, partially or entirely, within the matrix material 1, so as to form a composite material comprising or consisting of the matrix material 1 and the reinforcing material 2. In the example embodiments shown herein, the reinforcing material 2 has a woven construction, with warp and weft fibers that are oriented at substantially 90° (e.g., +/−3°, +/−2°, +/−1°, or exactly 90°) to each other, however, the reinforcing material 2 is not limited to such woven examples. Instead, the reinforcing material 2 can have any suitable construction. A further non-limiting example construction type for the reinforcing material 2 can include knitted materials. Non-limiting types of materials that can be used for the reinforcing material 2 include electrically conductive materials (e.g., metals and metal alloys), wear-resistant materials (e.g., naturally occurring fibers), carbon fiber, radio frequency modulating and/or attenuating materials, and the like.

The nozzle 100 can include a converging shape, such that a distance between the upper and lower surfaces 120, 122 tapers, or decreases, as a function of distance away from the orifice 110 of the nozzle 100. The width of the orifice 110 of the nozzle 100, is adjustable to alter and/or control the width of the composite material extruded from the orifice 110 of the nozzle 100. The width of the orifice 110 is measured in the direction perpendicular to the plane in which FIG. 1 is shown (e.g., into the page). The height of the orifice 110 of the nozzle 100 is adjustable to control a distance between the distal ends of the upper and lower edges 120, 122 of the nozzle 100. The height of the orifice 110 is measured in the vertical direction shown in FIG. 1 and is perpendicular to the width of the orifice 110, such that the height and width of the orifice 110 define, together, a plane.

The height of the orifice 110 can be selected based on a desired thickness of the layer being formed and/or of the reinforcing material 2 in the composite material after extrusion from the nozzle 100 through the orifice 110. The reinforcing material 2 can have, prior to extrusion through the orifice 110, a thickness that is greater than the height of the orifice 110, the convergent shape of the upper and lower surfaces 120, 122 of the nozzle 100 acting on the reinforcing material 2 to progressively crush or compress (e.g., in the height direction of the orifice 110) as the reinforcing material 2 moves towards the orifice 110. In the example embodiment, the reinforcing material 2 is a woven material having both warp fibers 2A and weft fibers 2E, the warp fibers 2A extending generally perpendicularly to the weft fibers 2E. The progressive compression of the reinforcing material 2 means that a thickness (e.g., an amplitude, in the woven pattern shown herein) of both the warp fibers 2A and the weft fibers 2E decreases as a function of distance from the orifice 110. Thus, the compression of the reinforcing material 2 is greatest at/in the orifice 110. Many reinforcing materials 2 are made of a material that will, after having been compressed by passing through the orifice, rebound to at least some degree, such that the thickness of the reinforcing material 2 is at least to some degree greater than the height of the orifice 110. The matrix material 1 is advantageously selected, at least in some embodiments, to not have any such rebound or expansion characteristics after being extruded from the orifice 110 of the nozzle 100, such that at least some portion of the warp and weft fibers 2A, 2E of the reinforcing material 2 will, after rebounding and/or expanding after being compressed during extrusion through the orifice 110, protrude through the upper and lower surfaces of the matrix material 1. This can, when the reinforcing material 2 has a greater resistance to wear and/or abrasion than the matrix material 1, produce a component with a layer (e.g., an outermost, exposed layer) that has greater wear and abrasion resistance than a component made without the composite material because the exposed portions of the reinforcing material 2 will be primarily contacted during use rather than the matrix material 1. An electrically conductive reinforcing material 2, which can be, for example and without limitation, in the form of a filament or a mesh, can be utilized for various purposes. For example, such an electrically conductive reinforcing material 2 can be utilized for providing a service with electrically conductive properties, effectively minimize static buildup, and/or establish a pathway for the transmission of electrical current within, through, and/or across the component formed from such electrically conductive reinforcing material 2 and the matrix material 1.

For ease of illustration, the reinforcing material 2 is shown in FIGS. 2, 3, and 5-8 with the warp fibers 2A extending parallel to the extrusion direction and with the weft fibers 2E extending perpendicular to the extrusion direction. However, it is particularly advantageous for the warp fibers 2A and the weft fibers 2E to both be inclined, preferably at the same angle as each other, relative to the extrusion direction, the warp and weft fibers 2A, 2E both extending in a plane defined by the width of the orifice 110 and the extrusion direction, an example of which is schematically illustrated in FIG. 3A. In FIG. 3A, which is a cross-sectional view in a cut plane that is parallel to the extrusion direction of the matrix material 1 and the reinforcement material 2 from the nozzle 100, both the warp fibers 2A and the weft fibers 2E are inclined at an angle relative to the extrusion direction, such that the only portions of the warp and weft fibers 2A, 2E visible in FIG. 3A are where such warp and weft fibers 2A, 2E pass through the cut plane.

Figure 4:
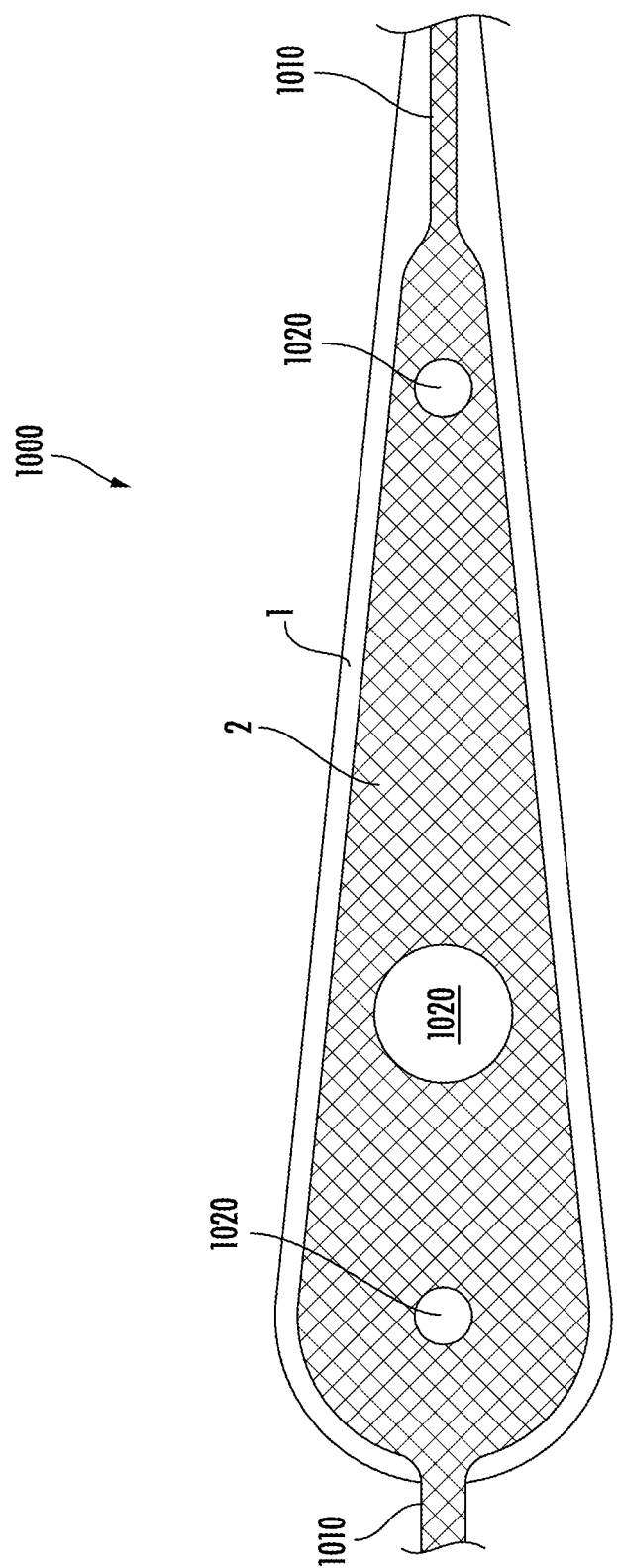
FIG. 4 is a top view of a layer of an example component formed using any of the systems and methods disclosed herein.

The reason why it is particularly advantageous for the warp fibers 2A and the weft fibers 2E to both be inclined at the same angle relative to the extrusion direction is because, due to the warp and weft fibers 2A, 2E both being inclined at the same relative angle to the extrusion direction, the elongation of the warp and weft fibers 2A, 2E that occurs as a result of the compression of the warp and weft fibers 2A, 2E passing through the nozzle 100 is substantially the same for both the warp fibers 2A and the weft fibers 2E. As used herein, the term "elongation" of the warp and weft fibers 2A, 2E can be measured, for the generally sinusoidally-woven fibers shown in the example embodiments described herein, by the compressed warp and weft fibers 2A, 2E having a greater period than the period of the uncompressed warp and weft fibers 2A, 2E of the reinforcing material 2. An example embodiment of a component having a layer in which the warp and weft fibers 2A, 2E of the reinforcing material 2 are oriented at the same magnitude angle but opposite direction (e.g., +45°/−45°) relative to the extrusion direction is shown in FIG. 4. Thus, in such an example embodiment, the elongation of the warp fibers 2A during compression of the reinforcing material 2 will be the same as (e.g., simultaneous with, and of a substantially identical magnitude of elongation) the elongation of the weft fibers 2E. As such, it is advantageous for the warp and weft fibers 2A, 2E of the reinforcing material 2 to be oriented, in every embodiment disclosed herein, at the same magnitude angle but opposite direction (e.g., +45°/-45°) relative to the extrusion direction.

The term "extrusion" is used throughout the description of each and every example embodiment to refer to any method or technique by which the composite material passes through the orifice 110, regardless of whether the composite material is "pushed" out of the orifice 110 (e.g., by pressure internal to the nozzle), "pulled" out of the orifice 110 (e.g., by a clamp grasping the reinforcing material 2, see FIG. 3), or a combination of such "pushing" and "pulling" of the composite material, or of any of the constituent parts thereof.

Figure 2:
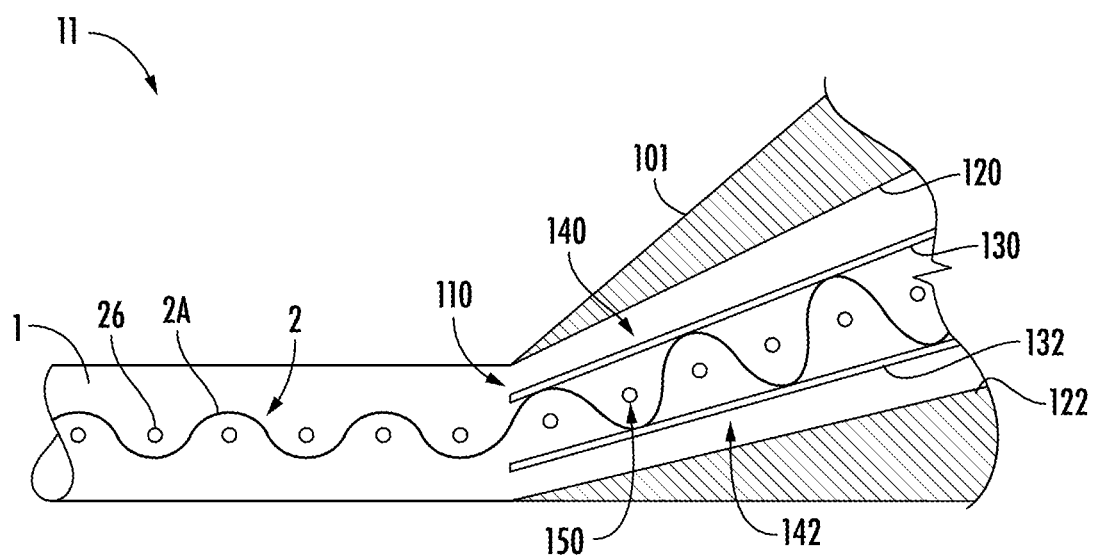
FIG. 2 is a schematic side view of another example embodiment of an additive manufacturing system having an extrusion head for a nozzle to extrude a composite material during additive manufacture of a component.

FIG. 2 shows a second example embodiment of an additive manufacturing system, generally designated 11, comprising a nozzle 101. The nozzle 101 is, except as described otherwise herein, substantially similar (e.g., identical to) the nozzle 100 shown and described in relation to FIG. 1. Features of the nozzle 101 that are substantially similar or identical to the features of the nozzle 100 may not be expressly described herein, however, reference to the description of the various parts and structures of the nozzle 100 that can be found elsewhere herein is appropriate to describe such substantially similar or identical features of the nozzle 101.

The nozzle 101 has an orifice 110, through which the composite material is extruded to form the layer of the component being formed. The width and height of the orifice 110 are adjustable to change or control a width and thickness, respectively, of the composite material being extruded from the orifice 110 and, thus, also of the layer of the component being formed. The nozzle 101 has, just as in nozzle 100, upper and lower surfaces 120, 122 that have a convergent design, a distance between the upper and lower surfaces 120, 122 decreasing progressively in a direction of the orifice 110. The nozzle 101 also has, internal to the nozzle 101, internal blades 130, 132. The internal blades 130, 132 are positioned spaced apart from each other along their entire length to define a channel 150 therebetween. The upper and lower internal blades 130, 132 are spaced apart from the upper and lower surfaces 120, 122, respectively, within the nozzle 101. Thus, the space between the upper internal blade 130 and the upper surface 120 defines a first bypass channel 140 and the space between the lower internal blade 132 and the lower surface 122 defines a second bypass channel 142.

As shown in FIG. 2, the reinforcement material 2 and the matrix material 1 pass through the channel 150 to be extruded through the orifice 110 of the nozzle, while only the matrix material 1 is extruded through the first and second bypass channels 140, 140. Because the matrix material 1 in the channel 150 and also in the first and second bypass channels 140, 142 are in a flowable state when being extruded through the orifice 110 of the nozzle 101, the matrix material 1 from the first bypass channel 140 will bond to the upper surface of the matrix material 1 from the channel 150 immediately after exiting the first bypass channel 140, such that the matrix material 1 from the first bypass channel 140 will be continuous with and indivisible from the matrix material 1 from the channel 150 after being extruded from the orifice 110 of the nozzle 101. Similarly, the matrix material 1 from the second bypass channel 142 will bond to the lower surface of the matrix material 1 from the channel 150 immediately after exiting the second bypass channel 142, such that the matrix material 1 from the second bypass channel 142 will be continuous with and indivisible from the matrix material 1 from the channel 150 after being extruded from the orifice 110 of the nozzle 101. Thus, the matrix material 1 within the layer 3 of composite material extruded from the orifice 110 of the nozzle 101 is monolithic and continuous, such that it cannot readily be determined where the matrix material 1 from the channel 150 begins or ends with respect to the matrix material 1 from the first and second bypass channels 140, 142.

In the example embodiment of the nozzle 101 shown in FIG. 2, the distal ends of the internal blades 130, 132 are in the plane defined by the height and width of the nozzle 101. However, in some embodiments, the internal blades 130, 132 may be formed such that the distal ends thereof are recessed within the nozzle 101 or protruding beyond the orifice 110 of the nozzle 101. The width of the internal blades 130, 132 can, in some embodiments, be adjustable simultaneous with the width of the orifice 110 of the nozzle 101.

The internal blades 130, 132 are adjustable relative to each other and also to the upper and lower surfaces 120, 122 of the nozzle 101, respectively, such that a distance between the distal ends of the internal blades 130, 132 can be adjusted, similarly to the adjustment of the height of the orifice 110 of the nozzle 100, described elsewhere herein. The positions of the internal blades 130, 132 can be selected based on a desired thickness of the internal sublayer being formed by the matrix material 1 and the reinforcing material 2 passing through the channel 150, as well as a position in the thickness direction of the internal sublayer within the layer 3. The height of the orifice 110 of the nozzle 101 is also adjustable, such that the total thickness of the layer being extruded through the orifice 110 of the nozzle 101 can be controlled. The height of the orifice 110 and the distance between the internal blades 130, 132 can be controlled independently of each other. Thus, the distance between the internal blades 130, 132 can be increased or decreased independent of the height of the orifice 110. The internal blades 130, 132 can be positioned and are movable independent of each other. Thus, a movement of the upper internal blade 130 does not necessarily require a corresponding movement of the lower internal blade 132. This allows, for example, the internal sublayer to be formed at a different point in the thickness direction of the layer 3. Stated somewhat differently, this allows for the thickness of the upper sublayer and the thickness of the lower sublayer to be controlled independent of each other, Thus, to move the internal sublayer "higher" within the thickness of the layer, the internal blades 130, 132 can be shifted in unison towards the upper surface 120, so as to maintain a same distance between the distal ends of the internal blades 132 and, thus, a substantially constant thickness for the internal sublayer, while simultaneously decreasing a thickness of the upper sublayer and increasing a thickness of the lower sublayer. Similarly, to move the internal sublayer "lower" within the thickness of the layer, the internal blades 130, 132 can be shifted in unison towards the lower surface 122, so as to maintain a same distance between the distal ends of the internal blades 132 and, thus, a substantially constant thickness for the internal sublayer, while simultaneously increasing a thickness of the upper sublayer and decreasing a thickness of the lower sublayer.

The composite material that passes through the channel 150 is referred to herein as an "internal sublayer," the matrix material 1 that passes through the first bypass channel 140 is referred to herein as an "upper sublayer," and the matrix material 1 that passes through the second bypass channel 142 is referred to herein as a "lower sublayer." Thus, unless one or both of the first and second bypass channels 140, 142 are closed due to a position of one or both of the internal blades 130, 132, the layer 3 generally comprises, in order through the thickness of the layer 3, an upper sublayer, an internal sublayer, and a lower sublayer.

The internal blades 130, 132 are movable between a maximum position and a minimum position. The minimum position can correspond to a position in which the distal ends of the internal blades 130, 132 are at a minimum distance from each other, this minimum distance corresponding to a minimum thickness of the reinforcing material 2. The minimum distance can be formed between the distal ends of the internal blades 130, 132 at any height of the orifice 110, so as to form the internal sublayer at any height in the thickness direction of the layer 3. The internal blades 130, 132 are also adjustable to the "maximum position," in which the internal blades 130, 132 effectively close off the first and second bypass channels 140, 142, thus substantially stopping a flow of the matrix material 1 through such first and second bypass channels 140, 142, in which case the channel 150 will be substantially the same height as the height of the orifice 150. The position of the internal sublayer within the layer 3, relative to the thickness direction of the layer 3, can be continuously adjusted by adjusting the position of the internal blades 130, 132.

The upper internal blade 130 can be moved into its maximum position to close off the first bypass channel 140 without the lower internal blade 132 being moved into its maximum position, such that the second bypass channel 142 can remain open while the first bypass channel 140 is closed. In such a configuration, the internal sublayer (i.e., and the reinforcing material 2 contained therein) can form an upper outermost surface of the layer 3, which, as described elsewhere herein, can be useful for exposing at least a portion of the reinforcing material 2 on this upper outermost surface of the layer 3. Similarly, the lower internal blade 132 can be moved into its maximum position to close off the second bypass channel 142 without the upper internal blade 130 being moved into its maximum position, such that the first bypass channel 140 can remain open while the second bypass channel 142 is closed. In such a configuration, the internal sublayer (i.e., and the reinforcing material 2 contained therein) can form a lower outermost surface of the layer 3, which, as described elsewhere herein, can be useful for exposing at least a portion of the reinforcing material 2 on this lower outermost surface of the layer 3. When the reinforcing material 2 has a greater resistance to wear and/or abrasion than the matrix material 1 and when the internal sublayer is at and/or defines either or both of the outermost surfaces of the layer 3, the use of such layer 3 as an outermost layer of the component can result in the component having greater wear and abrasion resistance than a component made with the internal sublayer spaced apart from such outermost surface(s) of the layer 3 by one or both of the first and second sublayers. The reason for this improved wear and abrasion resistance is because the exposed portions of the reinforcing material 2 will be primarily contacted during use rather than the matrix material 1.

When the internal blades 130, 132 are both in the maximum position, the nozzle 101 operates substantially identically to the nozzle 100 unless/until one or both of the internal blades 130, 132 is adjusted out of the maximum position.

The reinforcing material 2 can have, prior to passing through the channel 150, a thickness that is greater than the distance between the distal ends of the internal blades 130, 132, which are the ends nearest the orifice 110. The internal blades 130, 132 define, together, a convergent shape, similar to the shape of the upper and lower surfaces 120, 122 of the nozzle 100, such that the internal blades 130, 132 act on the reinforcing material 2 to progressively crush or compress (e.g., in the height direction of the orifice 110) as the reinforcing material 2 moves towards the orifice 110 through the channel 150. The matrix material 1 and the reinforcing material 2 can be the same as is described elsewhere herein in relation to the nozzle 100 and will not be further described herein in relation to the nozzle 101 since these materials are the same.

Figure 3:
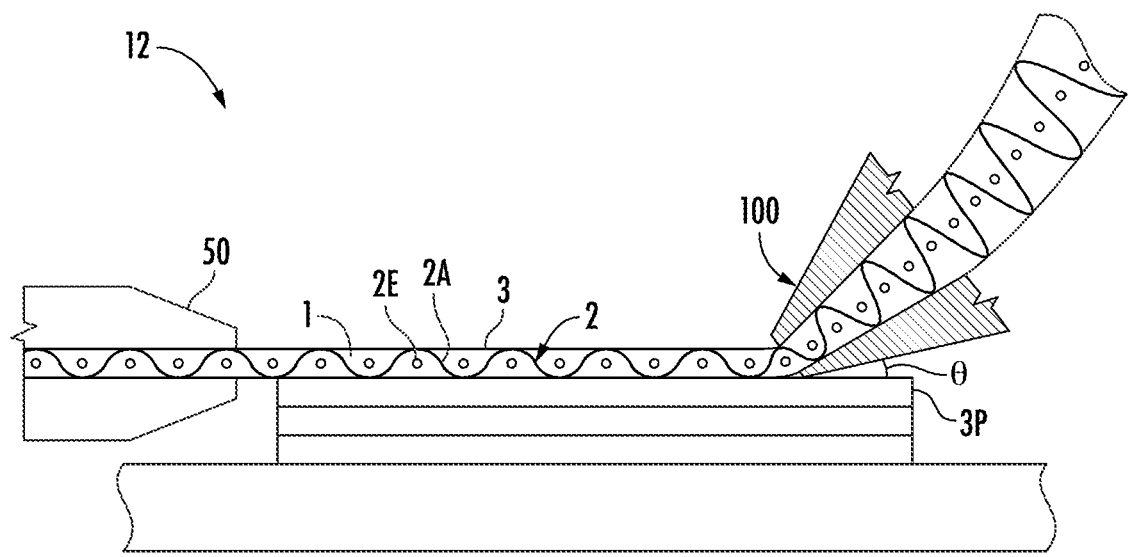
FIG. 3 is a schematic side view of the additive manufacturing system of FIG. 1, including a clamp used to secure in place the layer of the component while the nozzle extrudes the composite material to form the layer of the component.
Figure 3A:
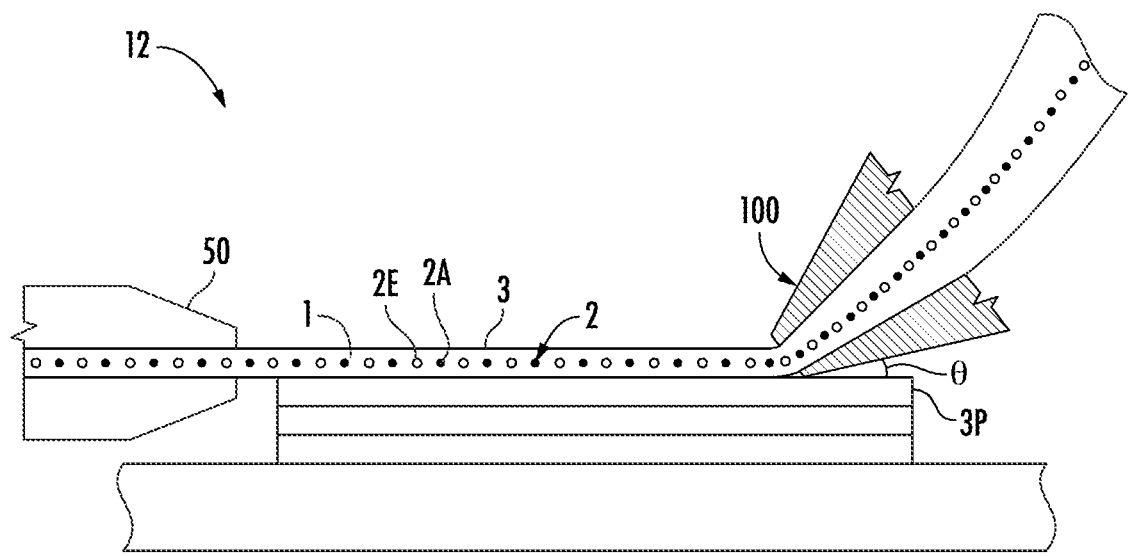
FIG. 3A is a schematic side view of the additive manufacturing system of FIG. 1, including a clamp used to secure in place the layer of the component while the nozzle extrudes the composite material to form the layer of the component, in which the warp and weft fibers of the reinforcement material are each at +/−45° angles relative to the direction of extrusion from the nozzle.

FIG. 3 shows an example embodiment of another example embodiment of an additive manufacturing system, generally designated 12, comprising a nozzle, which can be any of the example nozzles shown and/or described herein. In the example embodiment shown, however, the nozzle is the nozzle 100 shown in FIG. 1. FIG. 3 also shows, as an example, previously applied layer 3P. The additive manufacturing system 12 in FIG. 3 comprises a clamp 50. The clamp 50 does not change the operation of any of the nozzles disclosed elsewhere herein. The clamp 50 is used to grasp an edge region of the reinforcing material 2, directly or indirectly (i.e., by grasping the entire layer 3), and hold the edge region of the reinforcing material 2 in a static position while the nozzle 100 moves away from the clamp 50 to extrude the composite material from the orifice 110 of the nozzle 100. As best shown in FIG. 3, the each of the nozzles disclosed herein is configured to be inclined at an angle θ, which is less than 90° relative to a previously deposited layer of the component and/or to a build plate 70. The build plate 70 can comprise a heater configured to maintain and regulate a temperature on the surface of the build plate 70. The angle θ is preferably less than 45°, less than 30°, less than 25°, less than 20°, or less than 15°.

FIG. 4 shows an example component, generally designated 1000, produced using any of the additive manufacturing system and methods disclosed herein. The example component 1000 is in the form of an antenna seal. The reinforcing material 2 can be cut by a cutter from a substantially continuous source (e.g., a roll) of the reinforcing material as or before the reinforced material 2 is introduced into the extrusion head of any of the additive manufacturing systems disclosed herein. In some embodiments, the reinforcing material 2 is cut in the manner of a preform corresponding to the shape of the layer in which the cut reinforcing material 2 is to be embedded. The edges of the preformed reinforcing material 2 can be stitched or sewn, for example and without limitation, to prevent fraying and any holes 1020, such as those shown in FIG. 4, can be preformed and the edges of such holes 1020 can also be stitched or sewn, for example and without limitation, to also prevent fraying. In the example embodiment shown in FIG. 4, the reinforcing material 2 is cut from a substantially continuous source of the reinforcing material 2, as shown by the narrow portions 1010 of the reinforcing material 2 at the leading and trailing edges of the component 1000, these narrow portions 1010 being designated for removal from the component in a post-processing operation. The width of the nozzle is controlled to be the same as or wider than the width of the portion of the reinforcing material 2 being extruded from the nozzle, thereby ensuring accuracy of the width of the component 1000 along the entire length thereof.

Figure 5:
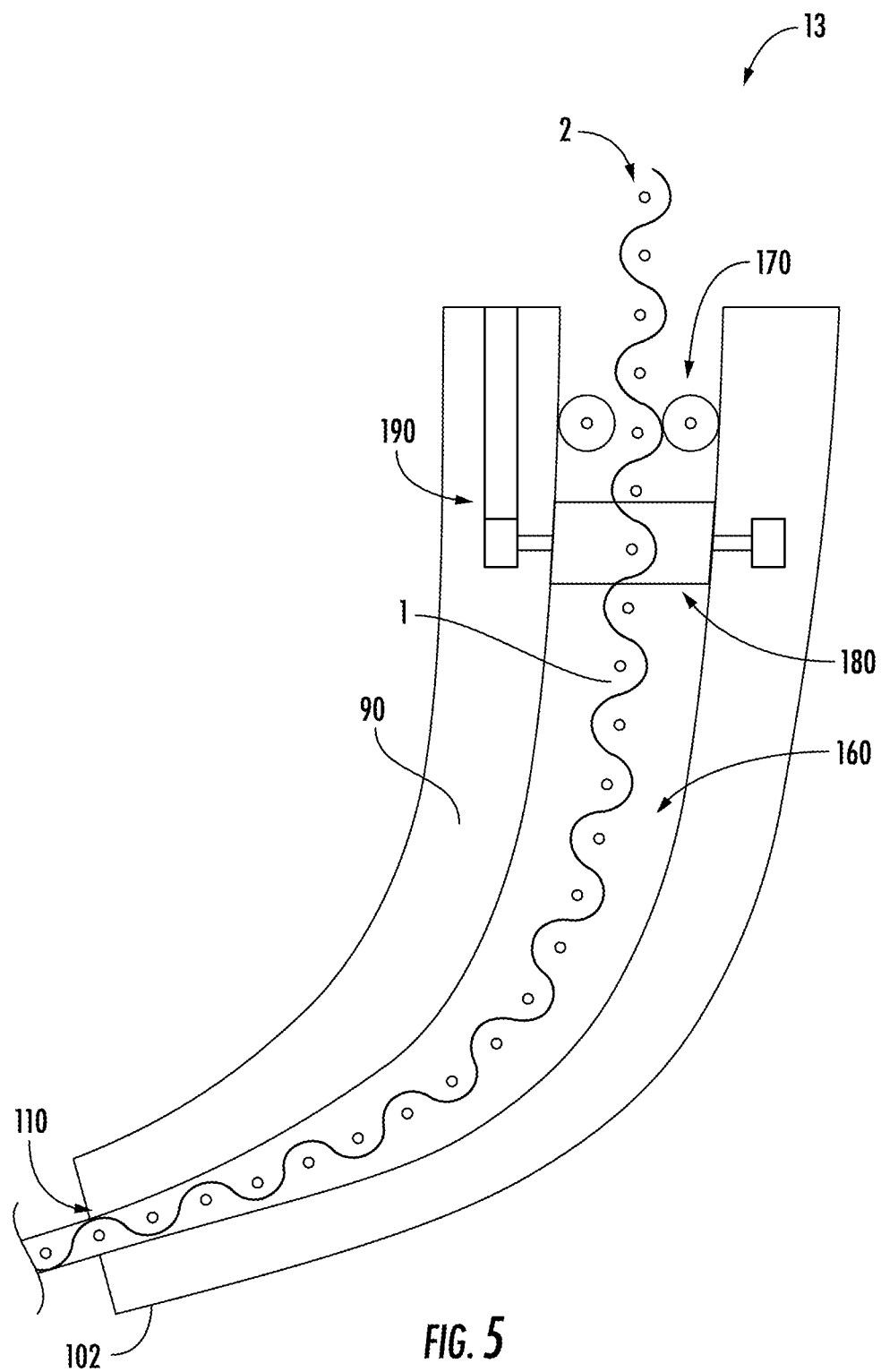
FIG. 5 is a schematic side view of another example embodiment of an additive manufacturing system having an extrusion head with a nozzle to extrude a composite material during additive manufacture of a component.

FIG. 5 shows another example embodiment of an additive manufacturing system, generally designated 13, comprising an extrusion head 90, with a nozzle 102 defined by an orifice 110 at a distal end of the extrusion head 90. The nozzle 102 is, except as described otherwise herein, substantially similar (e.g., identical to) the nozzle 100 shown and described in relation to FIG. 1. Features of the nozzle 102 that are substantially similar or identical to the features of the nozzle 100 may not be expressly described herein, however, reference to the description of the various parts and structures of the nozzle 100 that can be found elsewhere herein is appropriate to describe such substantially similar or identical features of the nozzle 102.

The extrusion head 90 comprises an extrusion channel 160 extending generally through and along a centerline of the extrusion head 90. The extrusion head 90 comprises a guide roller system 170 within the extrusion channel, at a proximal end of the extrusion channel 160. The guide roller system 170 is configured to guide the reinforcing material 2 into the extrusion channel 160. The rollers of the guide roller system 170 are positionally adjustable, such that a distance between rollers on opposite sides of the extrusion channel 160 and, thus, on opposite sides of the reinforcing material 2, can be adjusted to ensure that the reinforcing material 2 is compressed to a specified thickness. Spaced away from the guide roller system 170 and within the extrusion channel 160, the extrusion head 90 comprises an impregnator 180. The reinforcing material 2 passes from the guide roller system 170, having been compressed to the specified thickness, into the impregnator 180. The impregnator 180 comprises a structure on each side of the reinforcing material 2, each structure having a plurality of small orifices that are supplied by a matrix supply channel 190 with the matrix material 1. The matrix supply channel 190 can be fed by melting a granulate material or by a matrix material pusher. The matrix material 1 is extruded from the orifices of the impregnator to fully wet the reinforcing material 2 with the matrix material 1, producing a composite material that is substantially (e.g., entirely) devoid air pockets therein. This composite material continues along the extrusion channel 160 and is extruded from the orifice 110 of the nozzle 102 to form a layer of a component made via additive manufacturing. The extrusion head 90 has a curved shape, so that an angle at which the composite material is extruded from the nozzle 102 is less than 90° from the surface on which such composite material is to be deposited. Preferably, the angle is less than 45°, less than 30°, less than 25°, less than 20°, or less than 15°.

Figure 6:
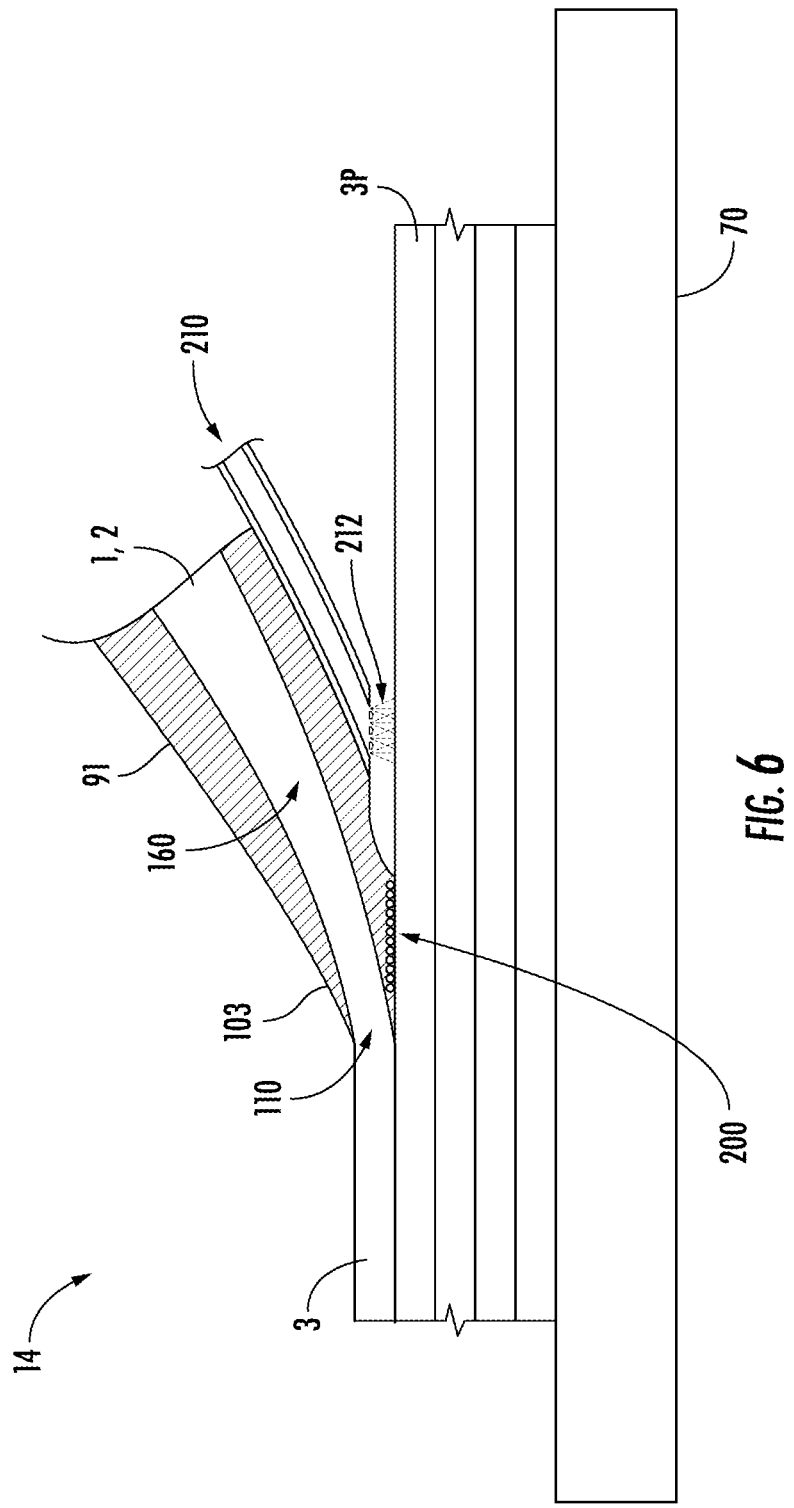
FIG. 6 is a simplified schematic side view of another example embodiment of an additive manufacturing system having an extrusion head with a nozzle to extrude a composite material during additive manufacture of a component.

FIG. 6 shows another example embodiment of an additive manufacturing system, generally designated 14, comprising an extrusion head 91, with a nozzle 103 defined by an orifice 110 at a distal end of the extrusion head 91. The nozzle 103 is, except as described otherwise herein, substantially similar (e.g., identical to) the nozzle 100 shown and described in relation to FIG. 1. Features of the nozzle 103 that are substantially similar or identical to the features of the nozzle 100 may not be expressly described herein, however, reference to the description of the various parts and structures of the nozzle 100 that can be found elsewhere herein is appropriate to describe such substantially similar or identical features of the nozzle 103.

The extrusion head 91 has an extrusion channel 160 extending along the length of the extrusion head 91, the extrusion channel 160 terminating at the orifice 110 of the nozzle 103. The operation of the extrusion channel 160 is substantially identical to the operation of the nozzle 100, such that a composite material comprising a reinforcing material 2 embedded within a matrix material 1 passes through the extrusion channel 160 and is extruded from the orifice 110 of the nozzle 103 to form part of a layer 3, which is deposited on either a build plate 70 or a previously deposited layer of the component being manufactured. The extrusion head 91 comprises, on a bottom surface of a lower part of the nozzle, a heater 200, which is arranged against a surface onto which the composite material is extruded to form the layer by the nozzle 103. The heater 200 is used to heat the lower part of the nozzle 103 which, when placed against a previously applied layer 3P of the component, preheats the previously applied layer 3P (e.g., for the purpose of pre-melting a thermoplastic previously deposited layer of the component to promote adhesion of the new layer to the previously deposited layer) before the layer 3 is deposited from the nozzle 103 onto the previously applied layer 3P. The extrusion head 91 also comprises, extending generally parallel to at least a portion of the extrusion channel 160, a secondary channel 210. There are one or more openings 212 at the distal end of the secondary channel 210. The secondary channel 210 is configured to allow a flow of a pretreatment medium (e.g., primer, bonding agent, plasma) therethrough, to the openings 212, so that the openings 212 spray (e.g., directly, such as by impingement) the pretreatment medium onto the previously applied layer 3P of the component being additively manufactured before the layer 3 is deposited from the nozzle 103 onto the previously applied layer 3P.

Figure 7:
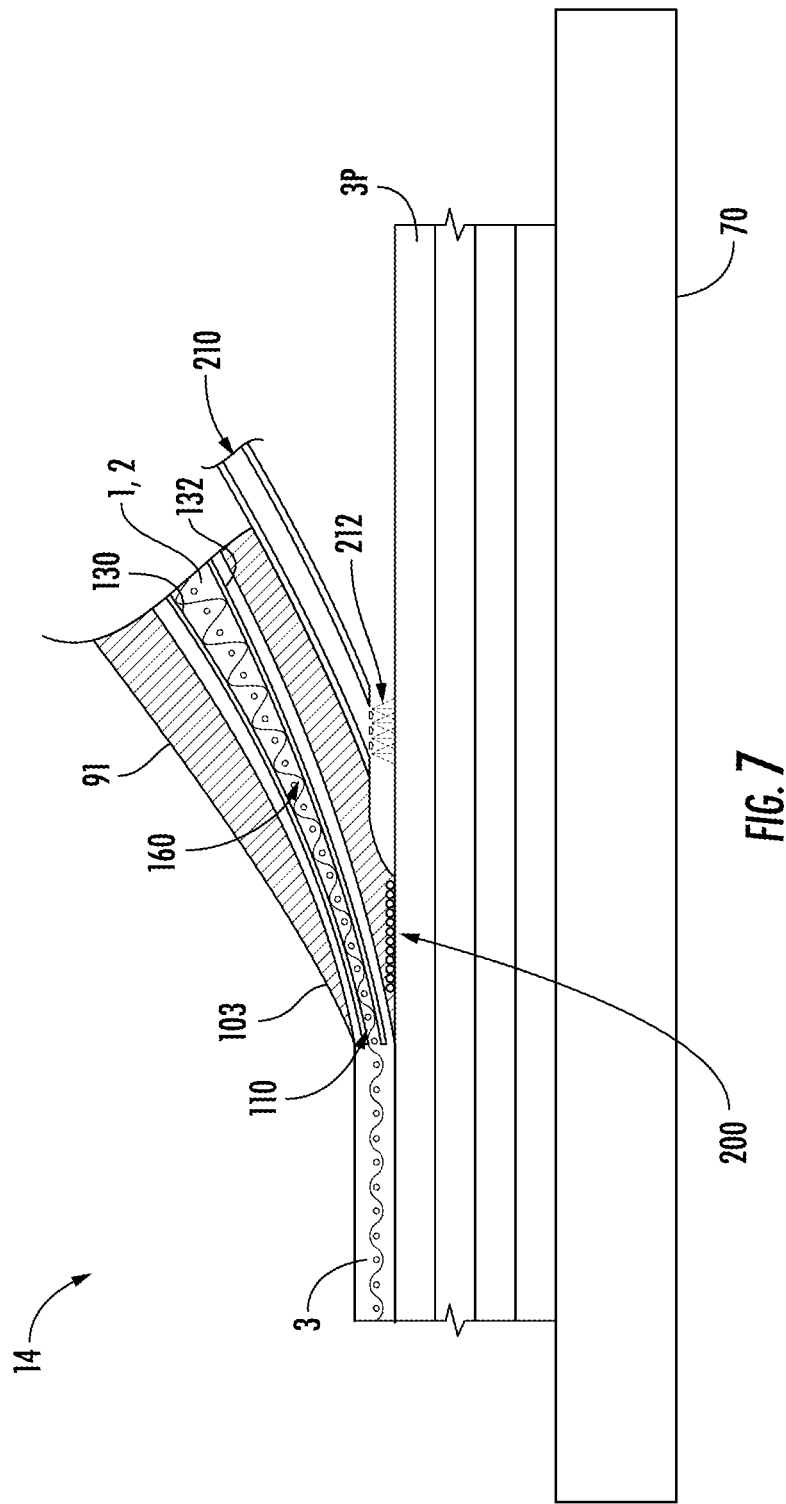
FIG. 7 is a schematic side view of the additive manufacturing system of FIG. 6, showing the reinforcing material within the extrusion channel of the nozzle.

FIG. 7 shows an alternate embodiment of the extrusion head 91 shown in FIG. 6. In FIG. 7, the extrusion head is generally designated 92. The only difference between the extrusion head 92 and the extrusion head 91 is that the extrusion head 92 has, within the extrusion channel 160 at the orifice 110 of the nozzle 104, the adjustable internal blades 130, 132 of the nozzle 101, shown in FIG. 2. The internal blades 130, 132 operate identically in the nozzle 104 as in the nozzle 101 and, as noted elsewhere herein, features of the nozzle 104 of the extrusion head 92 that are substantially similar or identical to the features of the nozzle 101 and/or of the nozzle 103 of the extrusion head 91 may not be expressly described herein, however, reference to the description of the various parts and structures of the nozzle 101 and/or the nozzle 103, as applicable, which can be found elsewhere herein is appropriate to describe such substantially similar or identical features of the nozzle 101 and/or nozzle 103.

Figure 8:
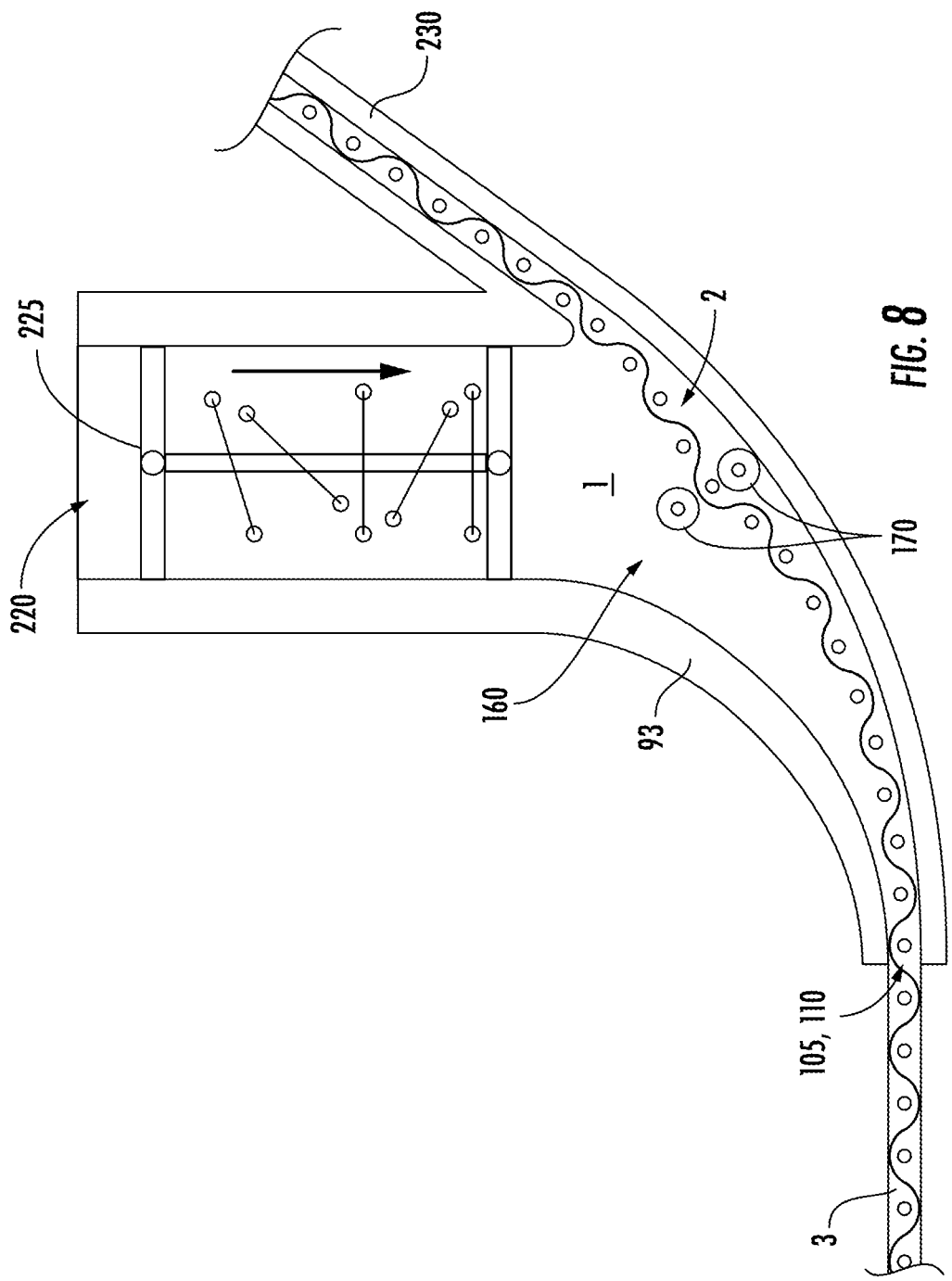
FIG. 8 is a schematic side view of another example embodiment of an additive manufacturing system having an extrusion head with a nozzle to extrude a composite material during additive manufacture of a component.

FIG. 8 shows another example embodiment of an additive manufacturing system, generally designated 15, comprising an extrusion head 93 with a nozzle 105 defined by an orifice 110 at a distal end of the extrusion head 93. The nozzle 105 is, except as described otherwise herein, substantially similar (e.g., identical to) the nozzle 102 shown and described in relation to FIG. 5. Features of the nozzle 105 that are substantially similar or identical to the features of the nozzle 102 may not be expressly described herein, however, reference to the description of the various parts and structures of the nozzle 102 that can be found elsewhere herein is appropriate to describe such substantially similar or identical features of the nozzle 105.

Unlike in the example embodiment shown in FIG. 5, the extrusion head 93 does not have an impregnator 180. Instead, the extrusion head 93 comprises two supply channels, referred to as a matrix supply channel 220 and a reinforcing material supply channel 230, both of which feed into an extrusion channel 160. In this embodiment, the roller guide system 170 is within the extrusion channel, after the matrix supply channel 220 and the reinforcing material supply channel 230 have merged together in the extrusion channel 160. The operation of the roller guide system 170 in the extrusion head 93 is substantially identical to the roller guide system 170 in the extrusion head 91, namely, adjusting a distance between rollers that are on opposite sides of the reinforcing material 2 to compress the reinforcing material 2 to a specified thickness. In some embodiments, however, the roller guide system 170 does not compress the reinforcing material 2, in which case the compression of the reinforcing material is carried out as the composite material is extruded from the orifice 110 of the nozzle 105, substantially identically to the operation of the nozzle 100.

During operation, the reinforcing material 2 is fed through the reinforcing material supply channel 230 from a supply of the reinforcing material by the rollers of the roller guide system 170 engaging against the reinforcing material 2 and pulling the reinforcing material through the reinforcing material supply channel 230 and simultaneously pushing the composite material containing the reinforcing material 2 out of the orifice 110 of the nozzle 105. The extrusion head 93 comprises, in the matrix supply channel 220, a mixer 225. In some example instances, the mixer 225 is supplied with a substantially homogenous matrix material 1. In other example instances, the mixer 225 is supplied with constituent parts that, when mixed together, form the matrix material 1. These constituent parts can be, for example, in the form of a resin and hardener and, optionally, additives that, when mixed together by the mixer 225, produces the matrix material 1, such as, for example, in the form of a multi-part polymer. The mixer 225 also, in addition to providing a mixing function, pushes the matrix material 1 into the extrusion channel 160 to embed the reinforcing material 2 therein. The matrix material 1 then infiltrates the reinforcing material 2 (e.g., to fully wet the fibers thereof) within the extrusion channel 160, forming a composite material that is extruded from the orifice 110 of the nozzle 105. The pressure from the flow of the matrix material 1 through the mixer 225 and into the extrusion channel 160, as well as the driving movement of the reinforcing material 2 caused by the roller guide system 170, causes the extrusion of the composite material from the nozzle 105, as well as ensuring full immersion of the reinforcing material 2 within the matrix material 1.

Figure 9:
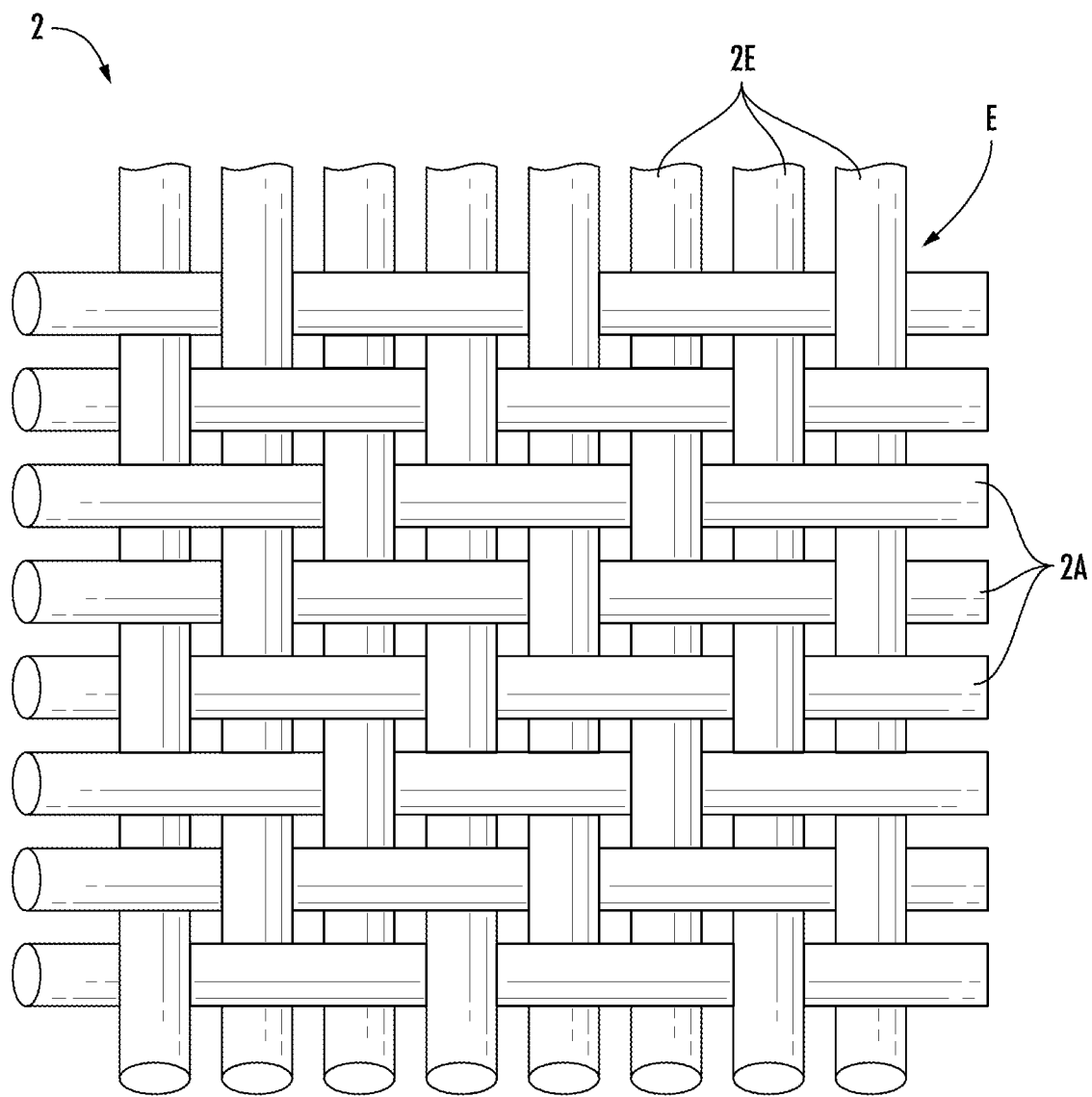
FIG. 9 is a top view of a woven reinforcing material that can be used as part of the composite materials extruded by the nozzles disclosed herein.

FIG. 9 shows an example embodiment of a woven material suitable for use as the reinforcing material 2. The reinforcing material 2 has warp fibers 2A that are arranged at substantially 90° angles to the weft fibers 2E. The arrow E indicates an extrusion direction that results in the warp and weft fibers 2A, 2E, respectively, being arranged at +45° and −45° angled thereto, commensurate with the example embodiment illustrated in FIG. 3A.

It is understood that the example embodiments disclosed herein are not limiting and do not restrict the subject matter disclosed herein. In particular, it will be evident to the person skilled in the art that the features described herein may be combined with each other arbitrarily, and/or various features may be omitted therefrom, without any resultant devices, systems, and/or methods deviating from the subject matter disclosed herein.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. An additive manufacturing system comprising:
an extrusion head comprising a nozzle configured to extrude a composite material from an orifice of the nozzle to form a layer of a component manufactured using additive manufacturing;
wherein the composite material comprises a matrix material and a reinforcing material that comprises a woven or knitted material having warp and weft fibers;
wherein the nozzle is configured to extrude the matrix material and the reinforcing material from the orifice simultaneously;
wherein a width and a height of the orifice of the nozzle are both adjustable to control a width and a thickness of the layer formed by the composite material extruded through the orifice of the nozzle;
wherein the width of the layer is substantially a same as the width of the orifice of the nozzle when the composite material is being extruded through the orifice of the nozzle;
wherein the thickness of the layer is substantially a same as the height of the orifice of the nozzle when the composite material is being extruded through the orifice of the nozzle;
wherein the width and the height of the orifice of the nozzle are perpendicular to each other;
wherein the width and the height of the orifice of the nozzle are transverse to a direction of extrusion of the composite material from the orifice of the nozzle; and
wherein the system is configured to dispense the reinforcing material from the nozzle such that a majority of a surface area of the reinforcing material is encapsulated within the matrix material.

2. The additive manufacturing system of claim 1, wherein the matrix material comprises or consists of an elastomeric material, a thermoplastic material, and/or a duroplastic material and/or wherein the reinforcing material consists of the woven or knitted material.

3. The additive manufacturing system of claim 2, wherein the woven material has a thickness that is a same as a thickness of the matrix material, such that at least a portion of the woven material is at or protruding through, to at least some degree, one or both outermost surfaces of the matrix material in a direction of the thickness of the layer.

4. The additive manufacturing system of claim 3, wherein:
the woven material is more wear-resistant than the matrix material; and/or
the woven material comprises an electrically conductive material.

5. The additive manufacturing system of claim 2, wherein the warp fibers are all arranged at about a 90° angle to the weft fibers.

6. The additive manufacturing system of claim 5, wherein the reinforcing material is oriented such that warp fibers and the weft fibers are arranged at about +45° and −45° orientations, respectively, relative to the direction of extrusion of the composite material from the orifice of the nozzle.

7. The additive manufacturing system of claim 2, wherein:
the nozzle comprises internal blades configured to dispense the woven material from a channel defined between the internal blades;
the system is configured to extrude matrix material from the channel simultaneously with the woven material for form an internal sublayer of the layer;
the internal blades define, on opposite sides of the channel, a first bypass channel and a second bypass channel; and
the nozzle is configured, when the first and second bypass channels are not closed, to extrude the matrix material to form first and second outer sublayers that are devoid of the woven material, the first outer sublayer being on an opposite side of the internal sublayer from the second outer sublayer.

8. The additive manufacturing system of claim 4, wherein:
a distance between the internal blades defines a thickness of the internal sublayer;
the woven material has a same thickness as the thickness of the internal sublayer; and
the distance between the internal blades is adjustable by moving the internal blades towards or away from each other to adjust the thickness of the internal sublayer and also a thickness of the first and/or second outer sublayers.

9. The additive manufacturing system of claim 8, wherein:
the internal blades are movable within the nozzle to adjust the distance between the internal blades between a minimum distance and a maximum distance; and
the maximum distance is substantially similar to the height of the orifice of the nozzle, such that the first and second bypass channels are closed by the internal blades when the internal blades are at the maximum distance.

10. The additive manufacturing system of claim 9, wherein the internal blades are movable independent of each other to adjust a position of the internal sublayer, relative to a direction of the thickness of the layer, within the layer, such that the internal sublayer is biased towards, or closer to, a first surface of the layer than a second surface of the layer, the first surface and the second surface being opposite surfaces of the layer that are spaced apart from each other in the direction of the thickness of the layer.

11. The additive manufacturing system of claim 10, wherein the nozzle is configured to extrude the woven material within the layer such that the woven material is:
at, adjacent to, and/or protruding through the first surface of the layer; and
spaced apart from and entirely covered or embedded within the second surface of the layer.

12. The additive manufacturing system of claim 11, wherein:
when the first and second bypass channels are open, the layer extruded from the orifice of the nozzle consists of the first outer sublayer, the second outer sublayer, and the internal sublayer, wherein the internal sublayer is between the first and second outer sublayers;
when the first bypass channel is open and the second bypass channel is closed, the layer extruded from the orifice of the nozzle consists of the first outer sublayer and the internal sublayer;
when the first bypass channel is closed and the second bypass channel is open, the layer extruded from the orifice of the nozzle consists of the second outer sublayer and the internal sublayer; and
when the first and second bypass channels are closed, the layer extruded from the orifice of the nozzle consists of the internal sublayer.

13. The additive manufacturing system of claim 11, wherein:
when the first and second bypass channels are open, the layer extruded from the orifice of the nozzle comprises the first outer sublayer, the second outer sublayer, and the internal sublayer, wherein the internal sublayer is between the first and second outer sublayers;
when the first bypass channel is open and the second bypass channel is closed, the layer extruded from the orifice of the nozzle comprises the first outer sublayer and the internal sublayer;
when the first bypass channel is closed and the second bypass channel is open, the layer extruded from the orifice of the nozzle comprises the second outer sublayer and the internal sublayer; and
when the first and second bypass channels are closed, the layer extruded from the orifice of the nozzle comprises the internal sublayer.

14. The additive manufacturing system of claim 1, wherein the nozzle is configured to extrude the composite material onto a build plate or a previously extruded layer of the component to form the layer of the component while the nozzle is inclined at an angle of 45° or less relative to a surface of the build plate or of the previously extruded layer onto which the composite material is extruded, and wherein, when the nozzle is inclined at the angle relative to the surface of the build plate, a plane that is defined by the width and the height of the orifice is substantially perpendicular to the surface of the build plate or of the previously extruded layer.

15. The additive manufacturing system of claim 1, comprising a build chamber, in which the component is additively manufactured, and a controller configured to control a temperature within the build chamber.

16. The additive manufacturing system of claim 1, comprising:
a tool head, to which the nozzle is operably attached, wherein the tool head is configured to rigidly support and control a movement of the nozzle; and
one or more of a cutter, a grinder, a suction head, and a spray nozzle, each of which is configured for operable connection to the tool head, wherein the cutter is configured to cut the reinforcing material to have a profile that corresponds to a profile of the layer of the component being extruded from the orifice of the nozzle.

17. The additive manufacturing system of claim 1, comprising a clamp that is configured to grasp an edge region of the reinforcing material, directly or indirectly, and hold the edge region of the reinforcing material in a static position while the nozzle moves away from the clamp to extrude the composite material from the orifice of the nozzle.

18. The additive manufacturing system of claim 1, wherein:
the extrusion head is configured to receive one or more matrix materials and/or a granulate material and to form the matrix material therefrom; and/or
the extrusion head comprises a mixer configured to mix together at least two components to form a multi-component polymer, the matrix material comprising the multi-component polymer; and/or the extrusion head is configured to intermix additives with the matrix material to control a color and/or one or more mechanical properties of the component; and/or the nozzle comprises internal opposing surfaces that converge towards each other in a direction of the orifice to form the reinforcing material to have a same thickness as the height of the orifice when the composite material is extruded from the orifice.

19. The additive manufacturing system of claim 1, wherein the nozzle comprises:

a heater in a lower part of the nozzle, the lower part of the nozzle being arranged against a surface onto which the layer is extruded by the nozzle, wherein the heater is configured to heat the lower part of the nozzle; and/or a passage through the lower part of the nozzle and openings formed in the lower part of the nozzle, the openings being in fluidic communication with the passage, the openings being directed to point towards a surface onto which the layer is extruded by the nozzle.

20. The additive manufacturing system of claim 19, wherein, before the layer is extruded from the nozzle onto a portion of the surface:

the passage is configured to transport a primer, a bonding agent, or a plasma to the openings; and the openings are configured to emit the primer, the bonding agent, or the plasma over and directly onto the portion of the surface.

21. An additive manufacturing system comprising:

an extrusion head comprising a nozzle configured to extrude a composite material from an orifice of the nozzle to form a layer of a component manufactured using additive manufacturing;

wherein the composite material comprises a matrix material and a reinforcing material;

wherein the nozzle is configured to extrude the matrix material and the reinforcing material from the orifice simultaneously;

wherein a width and a height of the orifice of the nozzle are both adjustable to control a width and a thickness of the layer formed by the composite material extruded through the orifice of the nozzle;

wherein the width of the layer is substantially a same as the width of the orifice of the nozzle when the composite material is being extruded through the orifice of the nozzle;

wherein the thickness of the layer is substantially a same as the height of the orifice of the nozzle when the composite material is being extruded through the orifice of the nozzle;

wherein the width and the height of the orifice of the nozzle are perpendicular to each other;

wherein the width and the height of the orifice of the nozzle are transverse to a direction of extrusion of the composite material from the orifice of the nozzle;

wherein the system is configured to dispense the reinforcing material from the nozzle such that a majority of a surface area of the reinforcing material is encapsulated within the matrix material;

wherein the nozzle comprises internal blades configured to dispense the woven material from a channel defined between the internal blades;

wherein the system is configured to extrude matrix material from the channel simultaneously with the woven material for form an internal sublayer of the layer;

wherein the internal blades define, on opposite sides of the channel, a first bypass channel and a second bypass channel; and wherein the nozzle is configured, when the first and second bypass channels are not closed, to extrude the matrix material to form first and second outer sublayers that are devoid of the woven material, the first outer sublayer being on an opposite side of the internal sublayer from the second outer sublayer.

22. An additive manufacturing system comprising:

an extrusion head comprising a nozzle configured to extrude a composite material from an orifice of the nozzle to form a layer of a component manufactured using additive manufacturing;

wherein the composite material comprises a matrix material and a reinforcing material;

wherein the nozzle is configured to extrude the matrix material and the reinforcing material from the orifice simultaneously;

wherein a width and a height of the orifice of the nozzle are both adjustable to control a width and a thickness of the layer formed by the composite material extruded through the orifice of the nozzle;

wherein the width of the layer is substantially a same as the width of the orifice of the nozzle when the composite material is being extruded through the orifice of the nozzle;

wherein the thickness of the layer is substantially a same as the height of the orifice of the nozzle when the composite material is being extruded through the orifice of the nozzle;

wherein the width and the height of the orifice of the nozzle are perpendicular to each other;

wherein the nozzle is configured such that the width of the orifice is adjustable independently of the height of the orifice;

wherein the width and the height of the orifice of the nozzle are transverse to a direction of extrusion of the composite material from the orifice of the nozzle; and wherein the system is configured to dispense the reinforcing material from the nozzle such that a majority of a surface area of the reinforcing material is encapsulated within the matrix material.

* * * * *